United States Patent
Ur et al.

(10) Patent No.: US 9,430,350 B2
(45) Date of Patent: Aug. 30, 2016

(54) INSTANCE MONITOR

(71) Applicant: EMPIRE TECHNOLOGY DEVELOPMENT, LLC, Wilmington, DE (US)

(72) Inventors: Shmuel Ur, Galil (IL); David Hirshberg, Haifa (IL); Vlad Grigore Dabija, Mountain View, CA (US); Shimon Gruper, Haifa (IL); Gad S. Sheaffer, Haifa (IL); Mordehai Margalit, Zichron Ya'Akov (IL)

(73) Assignee: Empire Technology Development LLC, Wilmington, DE (US)

( * ) Notice: Subject to any disclaimer, the term of this patent is extended or adjusted under 35 U.S.C. 154(b) by 190 days.

(21) Appl. No.: 13/983,654

(22) PCT Filed: Mar. 22, 2013

(86) PCT No.: PCT/US2013/033474
§ 371 (c)(1),
(2) Date: Aug. 5, 2013

(87) PCT Pub. No.: WO2014/149053
PCT Pub. Date: Sep. 25, 2014

(65) Prior Publication Data
US 2014/0289392 A1 Sep. 25, 2014

(51) Int. Cl.
G06F 15/173 (2006.01)
G06F 11/30 (2006.01)
G06F 11/14 (2006.01)
G06F 21/54 (2013.01)
G06F 21/55 (2013.01)

(52) U.S. Cl.
CPC ....... *G06F 11/3003* (2013.01); *G06F 11/1479* (2013.01); *G06F 11/3093* (2013.01); *G06F 21/54* (2013.01); *G06F 21/554* (2013.01); *G06F 2201/86* (2013.01); *G06F 2201/865* (2013.01)

(58) Field of Classification Search
USPC ......... 709/223, 224, 225, 227; 719/314, 313
See application file for complete search history.

(56) References Cited

U.S. PATENT DOCUMENTS

| | | | |
|---|---|---|---|
| 8,402,127 B2 * | 3/2013 | Solin | 709/223 |
| 8,819,701 B2 * | 8/2014 | Wheeler et al. | 719/314 |
| 2008/0091663 A1 | 4/2008 | Inala et al. | |

(Continued)

OTHER PUBLICATIONS

International Search Report and Written Opinion for PCT application with application No. PCT/US20131033474, dated Jun. 18, 2013, 26 pages.

*Primary Examiner* — Kyung H Shin
(74) *Attorney, Agent, or Firm* — Moritt Hock & Hamroff LLP; Steven S. Rubin, Esq.

(57) ABSTRACT

Methods to facilitate monitoring the execution of a first instance and a second instance, such as multiple instantiations of a program, are generally described. The methods may include generating a first instance and a second instance, appending first monitoring instructions to the first instance to produce a first modified instance and appending second monitoring instructions to the second instance to produce a second modified instance. The first and second monitoring instructions may relate to monitoring an execution of the first instance and the second instance. The processor may further send the first modified instance to a first computing device and send the second modified instance to a second computing device different from the first computing device. The computing devices may provide different computational functionality and/or may split a load in processing the program.

17 Claims, 6 Drawing Sheets

(56) References Cited

U.S. PATENT DOCUMENTS

| | | |
|---|---|---|
| 2010/0251339 A1 | 9/2010 | McAlister |
| 2011/0083138 A1 | 4/2011 | Sivasubramanian et al. |
| 2011/0145836 A1* | 6/2011 | Wheeler et al. .............. 719/314 |
| 2011/0246820 A1 | 10/2011 | Murao |
| 2011/0320598 A1* | 12/2011 | Solin ............................ 709/225 |
| 2013/0013767 A1 | 1/2013 | Stober et al. |

* cited by examiner

INSTANCE MONITOR

CROSS REFERNCE TO RELATED APPLICATION

This application is a U.S. national stage filing under 35 U.S.C. §371 of International Application No. PCT/US2013/033474 filed on Mar. 22, 2013, the entirety of which is hereby incorporated by reference.

BACKGROUND

Unless otherwise indicated herein, the materials described in this section are not prior art to the claims in this application and are not admitted to be prior art by inclusion in this section.

In a cloud computing environment, computer resources may be delivered as a service over a network, such as the Internet. Cloud computing may manage the infrastructure and platforms on which a user's data, software and computation are executed. Monitoring the performance of the computer resources may help ensure that the computer resources are functioning properly.

SUMMARY

In some examples, methods to facilitate monitoring the execution of a first instance and a second instance are generally described. The methods may include generating a first instance and a second instance by a processor. The methods may further including appending first monitoring instructions to the first instance to produce a first modified instance. The first monitoring instructions may relate to monitoring an execution of the first instance and the second instance. The methods may further including appending second monitoring instructions to the second instance to produce a second modified instance. The second monitoring instructions may also relate to monitoring an execution of the first instance and the second instance. The methods may further include sending the first modified instance to a first computing device and sending the second modified instance to a second computing device different from the first computing device.

In some examples, methods for monitoring the execution of a first instance and a second instance are generally described. The methods may include receiving a first modified instance by a first computing device, where the first modified instance may include a first instance and first monitoring instructions. The first monitoring instructions may relate to monitoring an execution of the first instance and a second instance. The method may include receiving a second modified instance by a second computing device, where the second modified instance may include a second instance and second monitoring instructions. The second monitoring instructions may relate to monitoring an execution of the first instance and the second instance. The method may further include executing the first modified instance by the first computing device to produce a first message. The method may further include sending, by the first computing device, the first message to the second computing device. The method may further include, executing the second modified instance by the second computing device to produce a second message. The method may further include sending, by the second computing device, the second message to the first computing device. The method may further include generating an alert, by the first computing device, based on the second message.

In some examples, systems effective to monitor execution of a first instance and a second instance are generally described. The systems may include a first computing device, a second computing device different from the first computing device, and a processor configured to be in communication with the first and second computing devices. The processor may be effective to generate a first instance and to generate a second instance. The processor may further be effective to append first monitoring instructions to the first instance to produce a first modified instance. The processor may further be effective to append second monitoring instructions to the second instance to produce a second modified instance. The processor may further be effective to send the first modified instance to the first computing device. The processor may further be effective to send the second modified instance to the second computing device. The first computing device may be effective to receive the first modified instance. The first computing device may be effective to execute the first modified instance to produce a first message, and send the first message to the second computing device. The second computing device may be effective to receive the second modified instance, execute the second modified instance to produce a second message, and send the second message to the first computing device. The first computing device may be further effective to generate an alert based on the second message.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to implementing an instance monitor.

Briefly stated, methods to facilitate monitoring the execution of a first instance and a second instance, such as multiple instantiations of a program, are generally described. The methods may include generating a first instance and a second instance, appending first monitoring instructions to the first instance to produce a first modified instance and appending second monitoring instructions to the second instance to produce a second modified instance. The first and second monitoring instructions may relate to monitoring an execution of the first instance and the second instance. The processor may further send the first modified instance to a first computing device and send the second modified instance to a second computing device different from the first computing device. The computing devices may provide different computational functionality and/or may split a load in processing the program.

Figure 1:
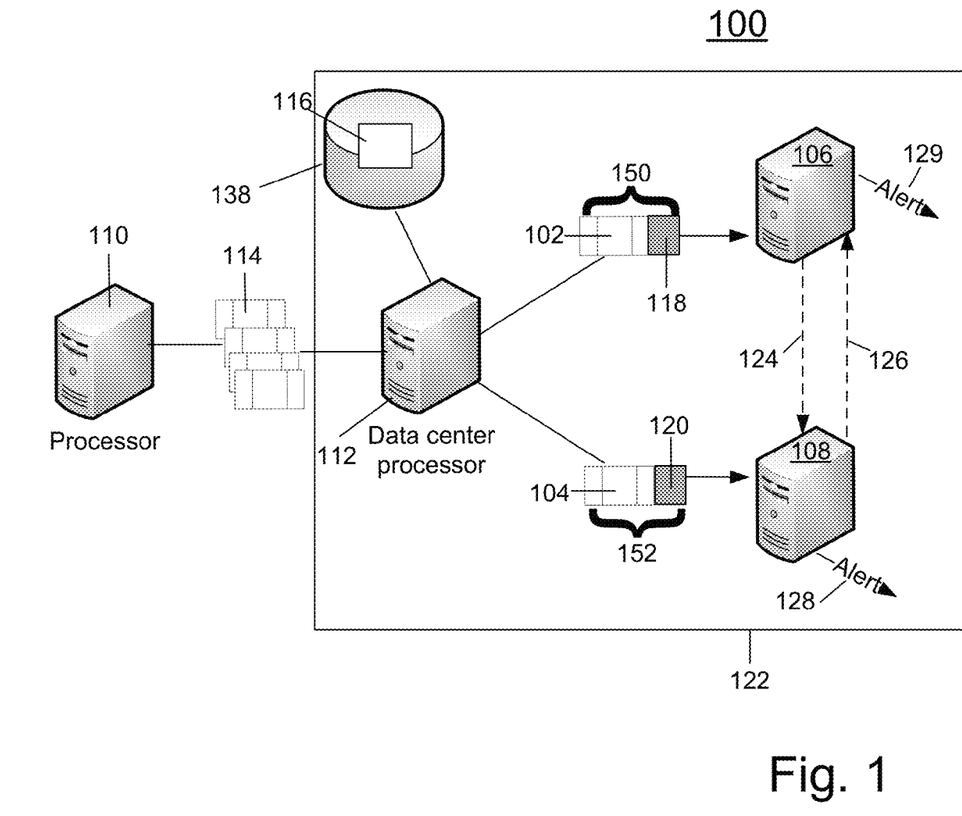
FIG. 1 illustrates an example system that can be utilized to implement an instance monitor.

FIG. 1 illustrates an example system that can be utilized to implement an instance monitor, arranged in accordance with at least some embodiments described herein. In some examples, a system 100 may include a processor 110, and/or a data center 122. Data center 122 may include a data center processor 112 and/or computing devices 106 and 108. Data center processor 112 may include a memory 138 that may include instructions 116.

Processor 110 may send one or more programs 114 to data center processor 112 for execution or processing on two or more computing devices. Programs 114 may be directed to any processing function such as, a search query, image processing action, running a web server, etc. Data center processor 112 may, such as by control of instructions 116, receive programs 114 and instantiate programs 114 on data center 122 by generating two or more matched instances 102 and 104. Data center processor 112 may include a single processor, multiple processors in a single housing, multiple processors in multiple housings, processors spread across a network such as in a cloud computing environment, etc. Although two instances (102 and 104) are shown in the example, any number of instances (two or greater) may be used and may monitor one another as discussed herein.

Data center processor 112, such as by control of instructions 116, may also append a monitoring instruction 118 to instance 102 to produce a modified instance 150 and may append a monitoring instruction 120 to instance 104 to produce a modified instance 152. Monitoring instruction 118 may provide instance 102 and computing device 106 instructions relating to monitoring an execution of instance 102 and instance 104. For example, monitoring instruction 118 may include: a location of computing device 106, a location of computing device 108, and a time or event when to send a message 124 from computing device 106 to computing device 108. In an example, monitoring instruction 118 may include instructions to send message 124 to computing device 108 in response to receiving a message from data center processor 112. Monitoring instruction 118 may also include: a time or event when to expect a message 126 from computing device 108, and expected information in message 126.

Similarly, monitoring instruction 120 may provide instance 104 and computing device 108 with monitoring instructions relating to execution of instance 104 and instance 102. As with monitoring instruction 118, monitoring instruction 120 may include a location of computing device 106, a location of computing device 108, and a time or event when to send message 126 from computing device 108 to computing device 106. In an example, monitoring instruction 120 may include instructions to send message 126 to computing device 106 in response to receiving a message from data center processor 112. Monitoring instruction 120 may also include: a time or event when message 124 is expected from computing device 106 and expected information in message 124.

Data center processor 112 may send modified instances 150 and 152 to computing devices 106 and 108, respectively, in data center 122. Computing device 106 may execute modified instance 150 by processing instance 102 and processing monitoring instruction 118. Monitoring instruction 118 may cause computing device 106 to produce and send message 124 to computing device 108 at a designated time or event. Similarly, computing device 108 may execute modified instance 152 by processing instance 104 and monitoring instruction 120. Monitoring instruction 120 may cause computing device 108 to process and send message 126 to computing device 106 at a designated time or event.

In examples where instance 102 does not perform as expected, message 124 may include unexpected information or message 124 may not be received by computing device 108 at an expected time or at an expected event. Computing device 108 may detect the unexpected information or that message 124 was not received at the expected time or event. In response to the detection of the unexpected information or that message 124 was not received at the expected time or event, computing device 108 may generate an alert 128. Alert 128 may indicate that computing device 106 may not be functioning properly or that instance 102 may be compromised. Alert 128 may be processed, such as by data center processor 112 and may be used to identify computing devices or instances operating outside of expected parameters.

In examples where instance 104 does not perform as expected, message 126 may include unexpected information or may not be received by computing device 106 at an expected time or at an expected event. Computing device 106 may detect the unexpected information or that message 126 was not received at the expected time or event. In response to the detection of the unexpected information or that message 126 was not received at the expected time or event, computing device 106 may generate an alert 129. Alert 129 may indicate that computing device 108 may not be functioning properly or that instance 104 may be compromised. Alert 129 may be processed, such as by data center processor 112, and may be used to identify computing devices or instances operating outside of expected parameters.

Figure 2:
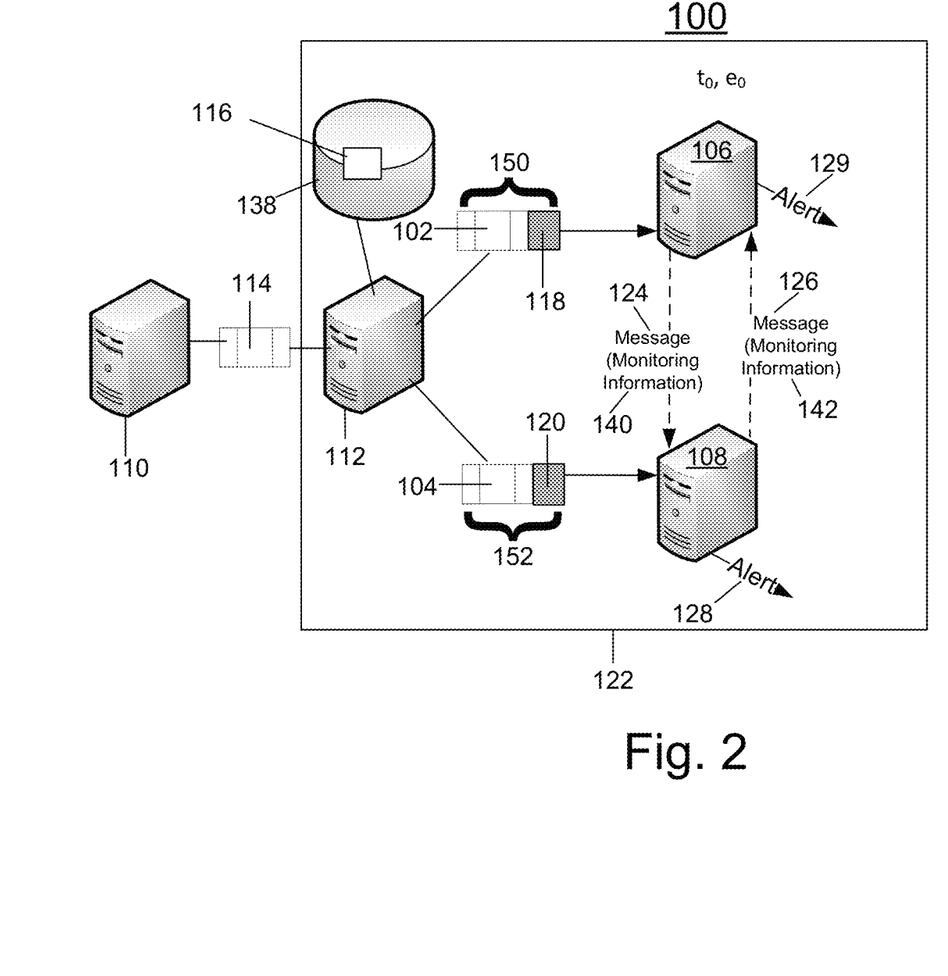
FIG. 2 illustrates an example system that can be utilized to implement an instance monitor.

FIG. 2 illustrates an example system that can be utilized to implement an instance monitor, arranged in accordance with at least some embodiments described herein. FIG. 2 is substantially similar to system 100, with additional details. Those components in FIG. 2 that are labeled identically to components of FIG. 1 will not be described again for the purposes of clarity.

Processor 110 may send program 114 to data center processor 112. Data center processor 112 may, such as by control of instructions 116, receive program 114 and may instantiate program 114 on data center 122 by generation of as two or more matched instances 102 and 104. Instances 102 and 104 may be related or unrelated. Data center processor 112 may be able to instantiate instances 102 and 104 from one or more than one program. Data center processor, such as by instructions 116 may also append monitoring instruction 118 to instance 102 to produce modified instance 150 and may append monitoring instruction 120 to instance 104 to produce modified instance 152. Monitoring instructions 118, 120 may be adapted to control modified instances 150 and 152 to communicate a current address of a computing device executing modified instances 150, 152 as is explained in more detail below.

Data center processor 112 may send modified instances 150 and 152 to computing devices 106 and 108 in data center 122. Computing device 106 may execute modified instance 150 by processing instance 102 and processing monitoring instruction 118. Monitoring instruction 118 may cause computing device 106 to send message 124 including monitoring information 140 to computing device 108 at a designated time $t_0$ or event $e_0$ identified in monitoring instruction 118. Designated time $t_0$ may be a defined time (e.g. 2:30 PM), or may be defined by a time interval (e.g. 5 milliseconds have passed from a milestone). Event $e_0$ may be related to the processing of instance 102 such as at an end of a task, completion of an intermediate step within a task, etc. In another example, monitoring instruction 118 may cause computing device 106 to send message 124, including monitoring information 140, to computing device 108 in response to a message from data center processor 112. Monitoring information 140 may include information related to instance 102, authentication information that may be used to authenticate message 124, a predefined code or query, or any other information defined by monitoring instructions 118. Message 124 may be sent over a dedicated channel. Message 124 may be encrypted such as through the use of an encryption key exchange.

Similarly, computing device 108 may execute modified instance 152 by processing instance 104 and processing monitoring instruction 120. Monitoring instruction 120 may cause computing device 108 to send message 126 including monitoring information 142 to computing device 106 at a designated time $t_0$ or event $e_0$ identified in monitoring instruction 120. In another example, monitoring instruction 120 may also cause computing device 108 to send message 126 to computing device 106 in response to receiving message 124. Monitoring information 142 may include information related to instance 104, authentication information, a predefined code or query, response to a query in message 126, or any other information defined by monitoring instructions 120. Message 126 may be sent over a dedicated channel. Message 126 may be encrypted such as through the use of an encryption key exchange.

Monitoring instruction 120 may include monitoring information expected to be received by computing device 108 from computing device 106 at time $t_0$ or at event $e_0$. In examples where computing device 106 or instance 102 is not operating as expected, message 124 may include monitoring information 140 that is different from expected information identified in monitoring instruction 120. In other examples where computing device 106 or instance 102 is not operating as expected, message 124 may not be received by computing device 108 at an expected time $t_0$ or after an expected event $e_0$.

Computing device 108 may detect that monitoring information 140 is different from expected information identified in monitoring instruction 120, or that message 124 was not received at the expected time $t_0$ or event $e_0$. In response to the detection of the different information or that message 124 was not received at the expected time $t_0$ or event $e_0$, computing device 108 may generate alert 128. Alert 128 may indicate that computing device 106 may not be functioning properly or that instance 102 has been compromised. Alert 128 may be processed, such as by data center processor 112, and may be used to identify computing devices operating outside of expected parameters, computing devices malfunctioning, viruses, security breaches, or other forms of malfunction or hacking.

Monitoring instruction 118 may include monitoring information expected to be received by computing device 106 from computing device 108 at time $t_0$ or at event $e_0$. In examples where computing device 108 or instance 104 is not operating as expected, message 126 may include monitoring information 142 that is different from expected information identified in monitoring instruction 118. In other examples where computing device 108 or instance 104 is malfunctioning, message 126 may not be received by computing device 106 at an expected time $t_0$ or after an expected event $e_0$.

Computing device 106 may detect that monitoring information 142 is different from expected information identified in monitoring instruction 118, or that message 126 was not received at the expected time $t_0$ or event $e_0$. In response to the detection of the different information or that message 126 was not received at the expected time $t_0$ or event $e_0$, computing device 106 may generate alert 129. Alert 129 may indicate that computing device 108 may not be functioning properly or that instance 104 has been compromised. Alert 129 may be processed, such as by data center processor 112 and may be used to identify computing devices operating outside of expected parameters, computing devices malfunctioning, viruses, security breaches, or other forms of malfunction or hacking.

In examples where computing device 106, instance 102, computing device 108, and instance 104 are functioning properly, at time ($t_0$) or event ($e_0$), monitoring information 140 and monitoring information 142 may include expected information identified in monitoring instructions 120 and 118 respectively. Message 124 and message 126 may also be received at time ($t_0$) or event ($e_0$) respectively by computing device 108 and computing device 106. In these examples, computing device 106 may verify that instance 104 and computing device 108 are functioning properly. Computing device 108 may verify that instance 102 and computing device 106 are functioning properly.

Monitoring information may be critical or non-critical. In an example of critical monitoring information, a first instance may send monitoring information to the second instance and wait for a response before moving forward in processing. An example of non-critical information may be where a first instance polls the state of the second instance and may generate the alert when the second instance does not respond as expected.

Figure 3:
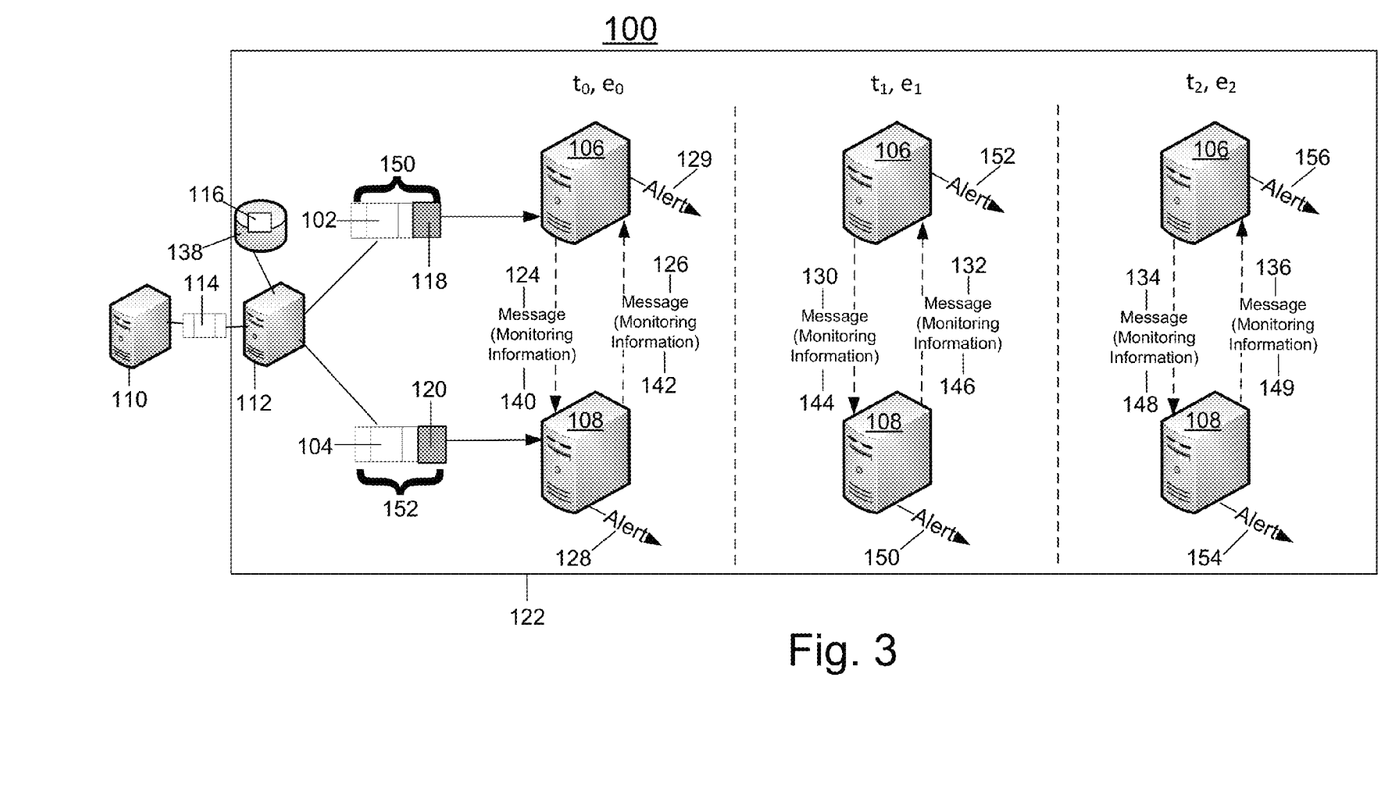
FIG. 3 illustrates an example system that can be utilized to implement an instance monitor.

FIG. 3 illustrates an example system that can be utilized to implement an instance monitor, arranged in accordance with at least some embodiments described herein. FIG. 3 is substantially similar to system 100, with additional details. Those components in FIG. 3 that are labeled identically to components of FIG. 1 and FIG. 2 will not be described again for the purposes of clarity.

Processor 110 may send program 114 to data center processor 112. Data center processor 112 may, such as by control of instructions 116, receive program 114 and may instantiate program 114 on data center 122 by generation of two or more matched instances 102 and 104. For example, program 114 may be a set of instructions to search a database. Instance 102 may be a set of instructions to search a first half of the database. Instance 104 may be a set of instructions to search a second half of the database. Data center processor, such as by instructions 116 may also append monitoring instruction 118 to instance 102 to produce modified instance 150 and may append monitoring instruction 120 to instance 104 to produce modified instance 152.

Data center processor 112 may send modified instances 150 and 152 to computing devices 106 and 108 in data center 122. Computing device 106 may execute modified instance 150 by processing instance 102 and processing monitoring instruction 118. Monitoring instruction 118 may cause computing device 106 to send message 124 including monitoring information 140 to computing device 108 at a designated time $t_0$ or event $e_0$ identified in monitoring instruction 118. Computing device 108 may execute modified instance 152 by processing instance 104 and processing monitoring instruction 120. Monitoring instruction 120 may cause computing device 108 to send message 126 including monitoring information 142 to computing device 106 at a designated time $t_0$ or event $e_0$ identified in monitoring instruction 120. Monitoring instruction 120 may also cause computing device 108 to send message 126 to computing device 106 in response to receiving message 124.

Monitoring information 140 and monitoring information 142 may include expected information identified in monitoring instructions 120 and 118 respectively and may also be respectively received at time $t_0$ or event $e_0$. Therefore, computing device 106 may verify that instance 104 and computing device 108 are functioning properly. Computing device 108 may verify that instance 102 and computing device 106 are functioning properly.

Computing device 106 may continue to execute modified instance 150 by processing instance 102 and processing monitoring instruction 118. Monitoring instruction 118 may cause computing device 106 to send a message 130 including monitoring information 144 to computing device 108 at another designated time $t_1$ or event $e_1$. Computing device 108 may also continue to execute modified instance 152 by processing instance 104 and processing monitoring instruction 120. Monitoring instruction 120 may cause computing device 108 to send message 132 including monitoring information 146 to computing device 106 at another designated time $t_1$ or event $e_1$. Monitoring instruction 120 may also cause computing device 108 to send message 132 to computing device 106 in response to receiving message 130.

Monitoring instruction 120 may include monitoring information expected to be received by computing device 108 at time $t_1$ or at event $e_1$. In examples where computing device 106 or instance 102 is malfunctioning, message 130 may include monitoring information 144 that is unexpected. In other examples where computing device 106 or instance 102 is malfunctioning, message 130 may not be received by computing device 108 at an expected time $t_1$ or after an expected event $e_1$.

Computing device 108 may detect that monitoring information 144 is unexpected or that message 130 was not received at the expected time $t_1$ or event $e_1$. In response to the detection of the unexpected information or that message 130 was not received at the expected time $t_1$ or event $e_1$, computing device 108 may generate alert 150.

Monitoring instruction 118 may include monitoring information expected to be received by computing device 106 at time $t_1$ or at event $e_1$. In examples where computing device 108 or instance 104 is malfunctioning, message 132 may include monitoring information 146 that is different from expected information identified in monitoring instruction 118. In other examples where computing device 108 or instance 104 is malfunctioning, message 132 may not be received by computing device 106 at an expected time $t_1$ or after an expected event $e_1$.

Computing device 106 may detect that monitoring information 146 is unexpected or that message 132 was not received at the expected time $t_1$ or event $e_1$. In response to the detection of the unexpected information or that message 132 was not received at the expected time $t_1$ or event $e_1$, computing device 106 may generate alert 152.

In examples where computing device 106, instance 102, computing device 108, and instance 104 are functioning properly, at time $t_1$ or event $e_1$, monitoring information 144 and monitoring information 146 may include expected information. Message 130 and message 132 may also be received at time $t_1$ or event $e_1$ respectively by computing device 108 and computing device 106. Computing device 106 may verify that instance 104 and computing device 108 are functioning properly. Computing device 108 may verify that instance 102 and computing device 106 are functioning properly.

In the example, a malicious code or Trojan may now be introduced and executed by instance 102. Computing device 106 may continue to execute modified instance 150 by processing instance 102 and processing monitoring instruction 118. Monitoring instruction 118 may cause computing device 106 to send message 134 including monitoring information 148 to computing device 108 at still another designated time $t_2$ or event $e_2$. Computing device 108 may also continue to execute modified instance 152 by processing instance 104 and processing monitoring instruction 120. Monitoring instruction 120 may cause computing device 108 to send message 136 including monitoring information 149 to computing device 106 at still another designated time $t_2$ or event $e_2$. Monitoring instruction 120 may also cause computing device 108 to send message 136 to computing device 106 in response to receiving message 134.

Monitoring instruction 120 may include monitoring information expected to be received by computing device 108 at time $t_2$ or at event $e_2$. In examples where computing device 106 or instance 102 is malfunctioning, message 134 may include monitoring information 148 that is unexpected. In other examples where computing device 106 or instance 102 is malfunctioning, message 134 may not be received by computing device 108 at an expected time $t_2$ or after an expected event $e_2$.

Computing device 108 may detect that monitoring information 144 is unexpected or that message 134 was not received at the expected time $t_2$ or event $e_2$. In response to the detection, of the unexpected information or that message 134 was not received at the expected time $t_2$ or event $e_2$, computing device 108 may generate alert 154.

Monitoring instruction 118 may include monitoring information expected to be received by computing device 106 at time $t_2$ or at event $e_2$. In examples where computing device 108 or instance 104 is malfunctioning, message 136 may include monitoring information 149 that is different from expected information in monitoring instruction 118. In other examples where computing device 108 or instance 104 is malfunctioning, message 136 may not be received by computing device 106 at an expected time $t_2$ or after an expected event $e_2$.

Computing device 106 may detect that monitoring information 149 is unexpected or that message 136 was not received at the expected time $t_2$ or event $e_2$. In response to the detection, of the unexpected information or that message 136 was not received at the expected time $t_2$ or event $e_2$, computing device 106 may generate alert 156.

Among other potential benefits, a system in accordance with the disclosure may be used to monitor instances and determine whether an instance and/or corresponding computing device are performing as expected. A first executed instance may be used to monitor a second executed instance. The two instances may be executed in geographically close locations so that time stamps and synchronization may be less critical than in other solutions. In an example, malicious code injection may be detected if the malicious code generates an overflow error and consequently the monitoring information would not include expected information. In examples where multiple instances are compromised, such a coordinated attack may be identified by detecting un-accounted synchronization of information between computing devices.

For example, one form of attack is a distributed denial of service (DDOS) attack. In this attack, multiple servers may be compromised and used to overload a target server. A cloud infrastructure may provide a large repository of servers for such attacks. Since a DDOS may be based on synchronized activity between servers, synchronization between disparate servers can indicate that a potential DDOS activity is occurring. In another example of a malicious attack, a network of servers can be used to relay information to obscure the original source of the information. In this network, instances executed by servers may be compromised and unwittingly participate in the network obscuring the original source of the information. By identifying synchronization in communication between disparate servers, a system in accordance with the disclosure can determine that the instances or servers may be compromised.

Figure 4:
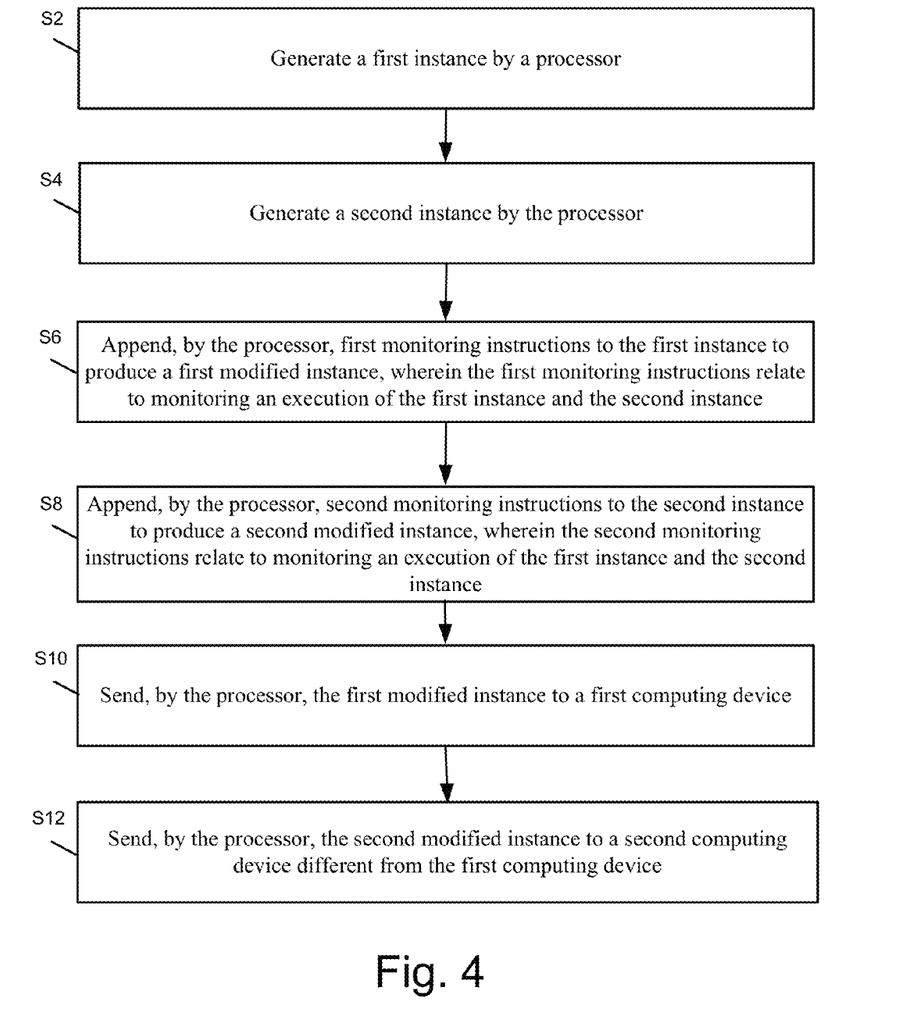
FIG. 4 depicts a flow diagram for an example process for implementing an instance monitor.

FIG. 4 depicts a flow diagram for example processes for implementing an instance monitor, arranged in accordance with at least some embodiments described herein. The process in FIG. 4 could be implemented using, for example, system 100 discussed above. An example of instance monitoring may include one or more operations, actions, or functions as illustrated by one or more of blocks S2, S4, S6, S8, S10 and/or S12. Although illustrated as discrete blocks, various blocks may be divided into additional blocks, combined into fewer blocks, or eliminated, depending on the desired implementation.

Processing may begin at block S2, "Generate a first instance by a processor". At block S2, a processor may be configured to generate a first instance. The processor may generate the first instance from a first program.

Processing may continue from block S2 to block S4, "Generate a second instance by the processor". At block S4, the processor may generate a second instance. The processor may generate the second instance from the first program used to generate the first instance, or may generate the second instance from a second program, different from the first program.

Processing may continue from block S4 to block S6, "Append, by the processor, first monitoring instructions to the first instance to produce a first modified instance, wherein the first monitoring instructions relate to monitoring an execution of the first instance and the second instance". At block S6, the processor may append first monitoring instructions to the first instance. The first monitoring instructions may include: a location of a first computing device, a location of a second computing device, and a time or event when to send a first message to the second computing device. First monitoring instructions may also include: a time or event when to expect a second message from a second computing device, and what information the second message should include.

Processing may continue from block S6 to block S8 "Append, by the processor, second monitoring instructions to the second instance to produce a second modified instance, wherein the second monitoring instructions relate to monitoring an execution of the first instance and the second instance". At block S8, the processor may append second monitoring instructions to the second instance. The second monitoring instructions may include: a location of a first computing device, a location of a second computing device, and a time or event when to send a second message to the first computing device. Second monitoring instructions may also include: a time or event when to expect a first message from the first computing device, and what information the first message should include.

Processing may continue from block S8 to block S10, "Send, by the processor, the first modified instance to a first computing device". The processor may send the first modified instance to a first computing device in a data center so that the instance may be executed. Execution of the first modified instance, at the first computing device, may include processing the first instance and processing the first monitoring instructions.

Processing may continue from block S10 to block S12, "Send, by the processor, the second modified instance to a second computing device different from the first computing device". The processor may send the second modified instance to a second computing device in the data center, different from the first computing device. Execution of the second modified instance, at the second computing device, may include processing the second instance and processing the second monitoring instructions.

Figure 5:
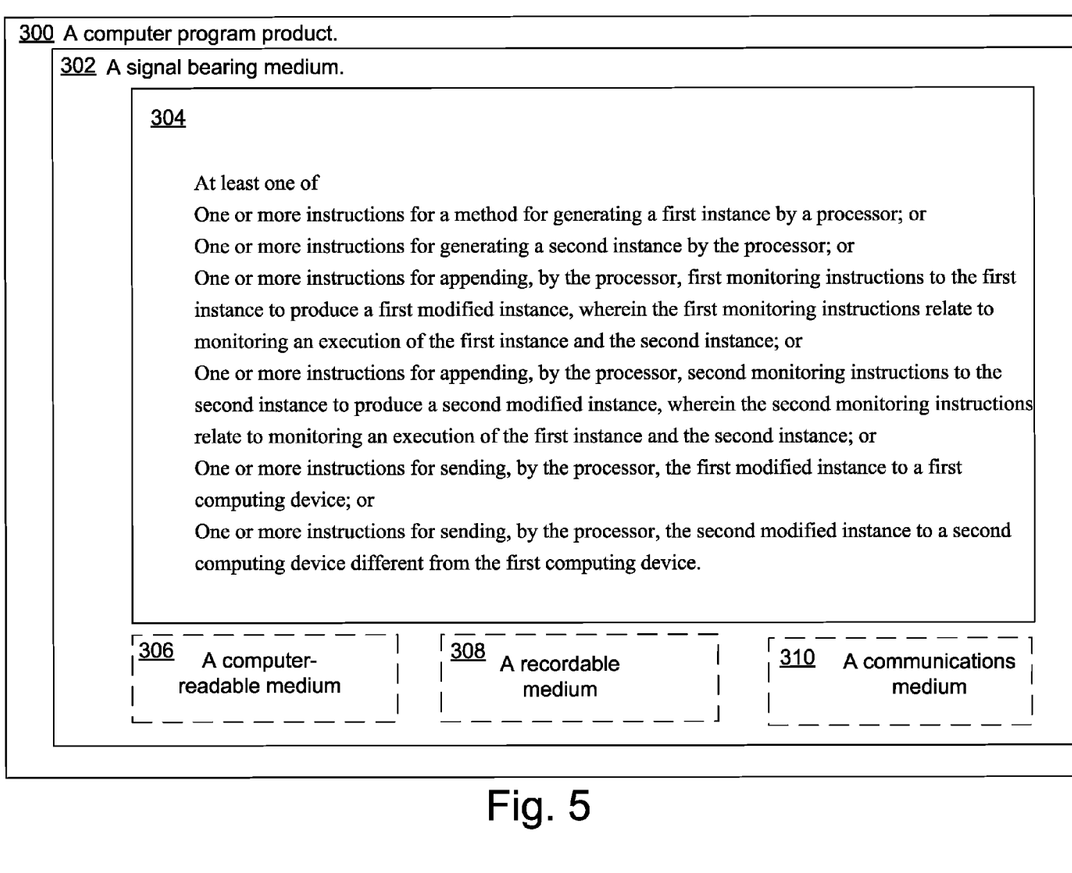
FIG. 5 illustrates a computer program product that can be utilized to implement an instance monitor.

FIG. 5 illustrates a computer program product that can be utilized to implement an instance monitor, arranged in accordance with at least some embodiments described herein. A computer program product 300 may include a signal bearing medium 302. Signal bearing medium 302 may include one or more instructions 304 that, when executed by, for example, a processor, may provide the functionality described above with respect to FIGS. 1-4. Thus, for example, referring to system 100, data center processor 112 and/or computing devices 106 or 108 may undertake one or more of the blocks shown in FIG. 5 in response to instructions 304 conveyed to the system 100 by signal bearing medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, a computer program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 6:
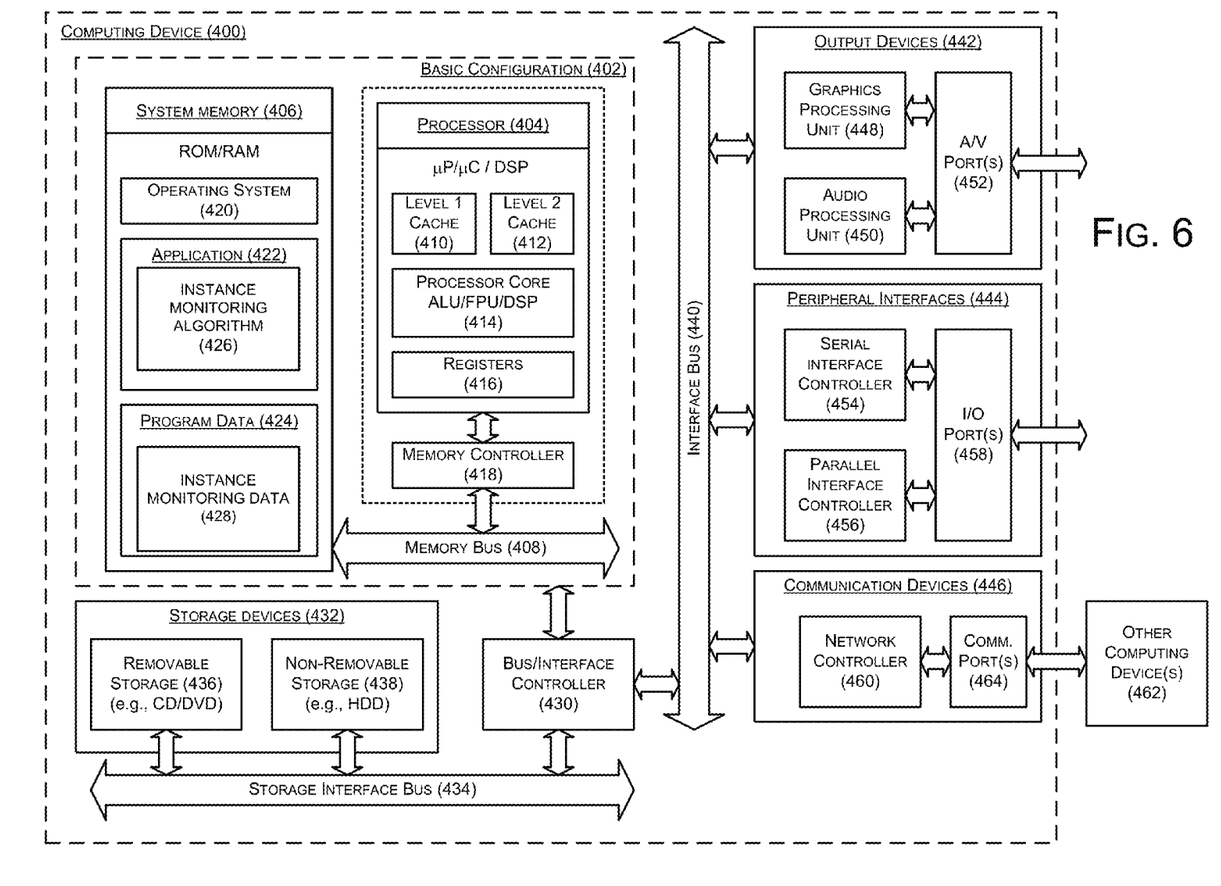
FIG. 6 is a block diagram illustrating an example computing device that is arranged to implement an instance monitor.

FIG. 6 is a block diagram illustrating an example computing device that is arranged to implement an instance monitor, arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include an instance monitoring algorithm 426 that is arranged to perform the various functions/actions/operations as described herein including at least those described with respect to system 100 of FIGS. 1-5. Program data 424 may include instance monitoring data 428 that may be useful for implementing an instance monitor as is described herein. In some embodiments, application 422 may be arranged to operate with program data 424 on operating system 420 such that labeling of exposed substrates supporting graphene may be provided. This described basic configuration 402 is illustrated in FIG. 6 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to facilitate monitoring execution of a first instance and a second instance, the method comprising:
    generating a first instance to be executed by a processor;
    generating a second instance to be executed by the processor;
    appending, by the processor, first monitoring instructions to the first instance to produce a first modified instance that includes the first instance and the first monitoring instructions, wherein the first monitoring instructions relate to monitoring an execution of the first instance and to monitoring an execution of the second instance;
    appending, by the processor, second monitoring instructions to the second instance to produce a second modified instance that includes the second instance and the second monitoring instructions, wherein the second monitoring instructions are different from the first monitoring instructions and relate to monitoring the execution of the first instance and to monitoring the execution of the second instance;
    sending, by the processor, the first modified instance to a first computing device to be executed by the first computing device; and
    sending, by the processor, the second modified instance to a second computing device different from the first computing device to be executed by the second computing device;
    wherein the first monitoring instructions include:
        a first location of the second computing device;
        a first time or first event when a first message is to be sent from the first computing device to the second computing device;
        a second time or second event when a second message from the second computing device is expected to be received at the first computing device; and
        first information expected in the second message; and
    the second monitoring instructions include:
        a second location of the first computing device;
        a third time or third event when the second message is to be sent from the second computing device to the first computing device;
        a fourth time or fourth event when the first message from the first computing device is expected to be received at the second computing device; and
        second information expected in the first message.

2. The method of claim 1, further comprising:
    receiving, by the processor, a program; and wherein:
        generating the first instance by the processor comprises generation of the first instance based on the program; and
        generating the second instance by the processor comprises generation of the second instance based on the program.

3. The method of claim 1, further comprising:
receiving, by the processor, a first program;
receiving, by the processor, a second program; and
wherein:
  generating the first instance by the processor comprises generation of the first instance based on the first program; and
  generating the second instance by the processor comprises generation of the second instance based on the second program.

4. The method of claim 1, wherein:
the first monitoring instructions include instructions to encrypt the first message to be sent from the first computing device to the second computing device; and
the second monitoring instructions include instructions to encrypt the second message to be sent from the second computing device to the first computing device.

5. The method of claim 1, wherein:
the first monitoring instructions include a request to send the first location of the first computing device in a first message from the first computing device to the second computing device; and
the second monitoring instructions include a request to send the second location of the second computing device in a second message from the second computing device to the first computing device.

6. A method for monitoring execution of a first instance and a second instance, the method comprising:
receiving a first modified instance by a first computing device, where the first modified instance includes a first instance appended to first monitoring instructions, wherein the first monitoring instructions relate to monitoring an execution of the first instance and to monitoring an execution of the second instance;
receiving a second modified instance by a second computing device, where the second modified instance includes a second instance appended to second monitoring instructions, wherein the second monitoring instructions are different from the first monitoring instructions, and wherein the second monitoring instructions relate to monitoring the execution of the first instance and to monitoring the execution of the second instance;
wherein the first monitoring instructions include:
  a first location of the second computing device;
  a first time or first event when a first message is to be sent from the first computing device to the second computing device;
  a second time or second event when a second message from the second computing device is expected to be received at the first computing device; and
  first information expected in the second message; and
the second monitoring instructions include:
  a second location of the first computing device;
  a third time or third event when the second message is to be sent from the second computing device to the first computing device;
  a fourth time or fourth event when the first message from the first computing device is expected to be received at the second computing device; and
  second information expected in the first message;
executing the first modified instance by the first computing device to produce the first message;
sending, by the first computing device, the first message to the second computing device; executing the second modified instance by the second computing device to produce the second message;
sending, by the second computing device, the second message to the first computing device; and
generating an alert, by the first computing device, based on the second message.

7. The method of claim 6, wherein
the method further includes:
  receiving, by the first computing device, the second message;
  analyzing the second message to determine whether the second message includes the first information; and
  generating the alert in response to the analysis.

8. The method of claim 6, further comprising generating the alert when the first computing device does not receive the first message at a designated time, does not receive the first message after an event, or does not receive the first message within a designated time interval.

9. The method of claim 8, wherein the event is an end of a task, or completion of an intermediate step within a task, related to execution of the first instance or execution of the second instance.

10. The method of claim 6, wherein generating the alert by the first computing device further comprises comparing information in the second message to the first monitoring instructions.

11. The method of claim 6, further comprising:
executing the first modified instance by the first computing device to produce an encrypted first message; and
executing the second modified instance by the second computing device to produce an encrypted second message.

12. The method of claim 6, further comprising sending, by the second computing device, the second message in response to the second computing device receiving the first message.

13. The method of claim 6, wherein:
the first message includes a first location of the first computing device; and
the second message includes a second location of the second computing device.

14. The method of claim 6, wherein:
the first message includes first information relating to the first or second instance; and
the second message includes second information relating to the first or second instance.

15. The method of claim 6, wherein:
the first message includes authentication information effective to authenticate the first message; and
the second message includes authentication information effective to authenticate the second message.

16. A system effective to monitor execution of a first instance and a second instance, the system comprising:
a first computing device;
a second computing device different from the first computing device; and
a processor configured to be in communication with the first and second computing devices;
the processor effective to:
  generate a first instance to be executed;
  generate a second instance to be executed;
  append first monitoring instructions to the first instance to produce a first modified instance that includes the first instance and the first monitoring instructions, wherein the first monitoring instructions relate to an execution of the first instance and to an execution of the second instance;
  append second monitoring instructions to the second instance to produce a second modified instance that includes the second instance and the second monitoring instructions, wherein the second monitoring instructions are different from the first monitoring instructions and relate to the execution of the first instance and to the execution of the second instance;

send the first modified instance to the first computing device; and send the second modified instance to the second computing device;

wherein the first monitoring instructions include:
- a first location of the second computing device;
- a first time or first event when a first message is to be sent from the first computing device to the second computing device;
- a second time or second event when a second message from the second computing device is expected to be received at the first computing device; and
- first information expected in the second message; and the second monitoring instructions include:
- a second location of the first computing device;
- a third time or third event when the second message is to be sent from the second computing device to the first computing device;
- a fourth time or fourth event when the first message from the first computing device is expected to be received at the second computing device; and
- second information expected in the first message;

the first computing device effective to:
- receive the first modified instance;
- execute the first modified instance to produce the first message; and send the first message to the second computing device;

the second computing device effective to:
- receive the second modified instance;
- execute the second modified instance to produce the second message; and
- send the second message to the first computing device;

wherein the first computing device is further effective to generate an alert based on the second message.

17. The system of claim 16, wherein the first computing device is further effective to generate the alert when the first computing does not receive the first message at a designated time, does not receive the first message after an event, or does not receive the first message within a designated time interval.

* * * * *